(12) United States Patent
Suzuki

(10) Patent No.: US 6,347,162 B1
(45) Date of Patent: *Feb. 12, 2002

(54) IMAGE PROCESSING APPARATUS

(75) Inventor: Ryo Suzuki, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,465

(22) Filed: Oct. 9, 1997

(30) Foreign Application Priority Data

Oct. 9, 1996 (JP) .............................................. 8-268275

(51) Int. Cl.[7] .............................................. G06K 9/54
(52) U.S. Cl. ..................... 382/303; 382/254; 358/296; 358/447
(58) Field of Search .................................. 382/303–304, 382/305, 276, 167, 299, 298, 254, 296; 348/96–97; 396/575, 570; 358/296, 298, 256, 471, 400, 452, 448, 403, 447, 474, 486, 500, 463, 518, 527; 235/462, 462.01, 462.07, 462.41, 439; 355/3, 5, 29, 69, 77, 310

(56) References Cited

U.S. PATENT DOCUMENTS

| | | | | | |
|---|---|---|---|---|---|
| 4,751,583 A | * | 6/1988 | Levine | ........................ | 358/256 |
| 5,260,777 A | * | 11/1993 | Komine et al. | ............. | 358/500 |
| 5,568,270 A | * | 10/1996 | Endo | ........................... | 358/298 |
| 5,784,149 A | * | 7/1998 | Kawaoka | ..................... | 355/35 |
| 5,799,111 A | * | 8/1998 | Guissin | ...................... | 382/254 |
| 5,844,226 A | * | 12/1998 | Suzuki | ....................... | 235/462 |

* cited by examiner

Primary Examiner—Leo Boudreau
Assistant Examiner—Ishrai Sherali

(57) ABSTRACT

An image processing apparatus subjects image data read out by an image reading apparatus to a predetermined image processing, and outputs the thus obtained image data to an image recording apparatus as image data in accordance with recording. The apparatus includes an image processing unit for subjecting the image data read out by the image reading apparatus to the predetermined image processing and a condition setting unit for setting image processing conditions in the image processing unit. An image buffer is included for storing the image data processed in the image processing unit and a recording device is further connected to the image buffer. According to this image processing apparatus, outputting of finished prints and outputting of image data to a recording medium are carried out in parallel, whereupon users can be provided with the finished prints and a recording medium storing the image data of images on the finished prints.

21 Claims, 3 Drawing Sheets

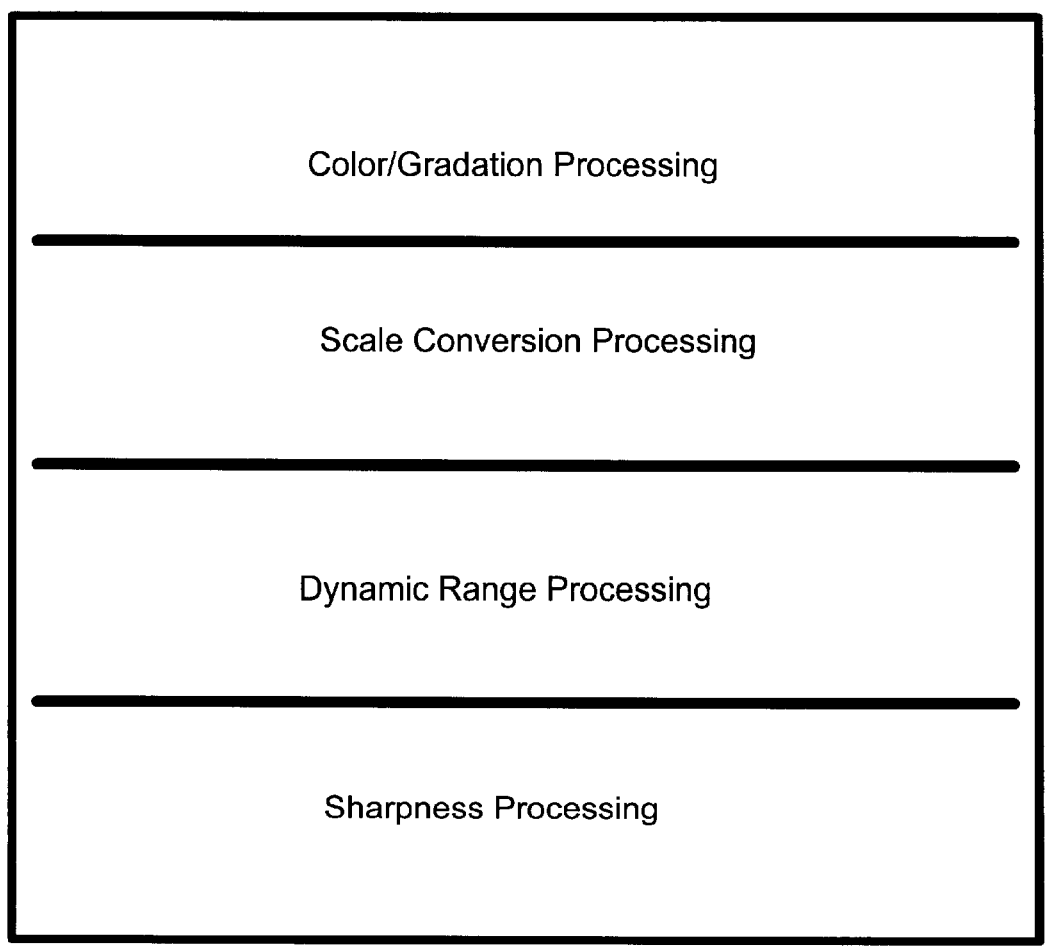

IMAGE PROCESSING APPARATUS

BACKGROUND OF THE INVENTION

The present invention relates to the technical field of an image processing apparatus for carrying out image processing of image data read out by an image reading apparatus. More specifically, it relates to an image processing apparatus capable of simultaneously supplying image data to an image recording apparatus and to a recording medium such as a magneto optical recording disk (MO).

At present, an image recorded on a photographic film such as a negative film, a reversal film and the like (hereinafter referred to as a film) is printed on a photosensitive material such as a photographic paper and the like, mainly by a technique called "direct exposure". In direct exposure, the photosensitive material is subjected to areal exposure by means of projected light carrying the information of the image on the film.

Recently, printers making use of digital exposure, that is, digital photoprinters have been developed and commercialized. In the digital photoprinters, after image information recorded on a film is photoelectrically read out, the read-out image information is subjected to various kinds of image processing to provide digital image data (digital image signals) to be recorded. Then, a photosensitive material is scanned and exposed with recording light modulated in accordance with the image data. Thereby, an image (a latent image) is recorded and the recorded image is developed, and the photographic print is obtained.

In the digital photoprinters, since a film is photoelectrically read out and exposure conditions are determined based on a color/density correction and the like carried out by signal processing, a period of time during which a unit image is exposed is short and the exposure time is constant in accordance with the image size. As a result, printing can be promptly carried out as compared with the conventional areal exposure.

Editing such as combining of a plurality of images, division of an image and the like, and image processing such as color/density adjustment and the like, can be carried out freely, and finished prints which were edited and processed freely in accordance with their use can be output. In prints made by the conventional direct exposure, images recorded on a film or the like cannot be perfectly reproduced in some points such as resolution, color/density reproducibility and the like. With the digital photoprinters however, can be output prints which realized nearly perfect reproduction of the images (image density information) recorded on a film or the like.

Basically, the digital photoprinters as described above comprise an image reading apparatus (scanner), an image processing apparatus (image processor), and an image recording apparatus (printer).

In the scanner, reading light produced by a light source impinges upon a film to thereby obtain projected light which carries an image recorded on the film. The image carried by the projected light is formed in an image sensor such as a CCD (charge coupled device) sensor or the like through an imaging lens, and is read out by subjecting the projected light to photoelectrical conversion in the image sensor. Then, after the thus read image is subjected to various kinds of image processing as required, the image is input to the image processing apparatus as image data (image information) on a film.

The image processing apparatus sets image processing conditions in accordance with the image data input from the scanner and displays the image on a display. After the operator carries out as required testing and adjustment of the image processing conditions, the image data are subjected to a determined image processing and input to the printer as output image data (exposure conditions) for image recording.

In the printer, in the case of an apparatus making use of a light beam scanning exposure for example, light beams are modulated in accordance with the image data input from the image processing apparatus and deflected in a main scanning direction. Also, a photosensitive material (photographic paper) is conveyed in an auxiliary scanning direction which is normal to the main scanning direction. In this manner, the photosensitive material is two-dimensionally exposed to (or printed by) the light beams carrying an image to thereby form a latent image. The photosensitive material is then subjected to development processing in accordance with the nature of the photosensitive material. A finished print (photograph) reproducing the image recorded on a film is thereby obtained.

In the digital photoprinter, image data to be recorded by the printer are produced, and are used for image recording on a finished print, as described above. It is also possible as required to output the image data on the finished print to a recording medium such as a MO, a floppy disk and the like, and store therein, instead of outputting the finished print.

Any number of finished prints of a desired image can be output by storing image data in such a recording medium, even if there is no negative film or the like. The operation can be promptly and simply carried out, since the exposure conditions are predetermined.

The field of application where the image on a finished print is output to a recording medium as image data, is deemed to be enlarged together with the recent spread of digital cameras and personal computers.

In the conventional digital photoprinters however, it is only one of finished prints and image data that can be output, and a system capable of outputting the image data to both a printer and a recording medium at the same time has not so far realized.

SUMMARY OF THE INVENTION

An object of the present invention is to provide an image processing apparatus which receives image data read out by a scanner, subjects the received image data to a predetermined image processing, and outputs the image data in accordance with recording (the image data to be recorded), wherein said image processing apparatus is capable of outputting simultaneously the produced image data to both a printer and a recording medium. That is, it is capable of carrying out printing of a finished print and outputting of the image data to the recording medium in parallel, to thereby provide users with both the finished print and the recording medium having the image data stored therein.

In order to achieve the above object, the invention provides an image processing apparatus which subjects image data read out by an image reading apparatus to a predetermined image processing, and outputs the thus obtained image data to an image recording apparatus as image data in accordance with recording, said image processing apparatus comprising:

an image processing unit for subjecting the image data read out by said image reading apparatus to the predetermined image preocessing;

a condition setting unit for setting image processing conditions in said image processing unit;

an image buffer for storing the image data processed in said image processing unit; and a recording device which is connected to said image buffer.

It is preferred that the image recording apparatus outputs a finished print on which the image data in accordance with recording is recorded and that the recording device outputs a recording medium which stores the image data recorded on the finished print.

The image processing unit preferably carries out the predetermined image processing by the pipeline processing.

It is also preferred that the condition setting unit sets the image processing conditions using prescanned image data photoelectrically read out at a low resolution by the image reading apparatus.

It is further preferred that the image processing unit carries out the predetermined image processing to fine-scanned image data photoelectrically read out at a high resolution after the image processing conditions has been set by the condition setting unit, and that the image processing unit comprises a color/gradation processing unit for correcting a color and a gradation of an image, a scale convention processing unit for enlarging and reducing the image, a dynamic range processing unit for compressing and expanding a dynamic range of the image data of one frame of the image and a sharpness processing unit for enhancing a sharpness of the image, and carries out a color/gradation processing, a scale conversion processing, a dynamic range processing and a sharpness processing by the pipe processing.

It is still further preferred that the image processing apparatus further comprises an compression/expansion unit for compressing the image data to be stored by the recording device and expanding the compressed image data read out by the recording device, and which is provided between the image buffer and the recording device.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a block diagram showing the image processing unit of FIG. 1.

DETAILED DESCRIPTION OF THE INVENTION

A preferred embodiment of an image processing apparatus of the present invention will be described below in detail with reference to accompanying drawings.

Figure 1:
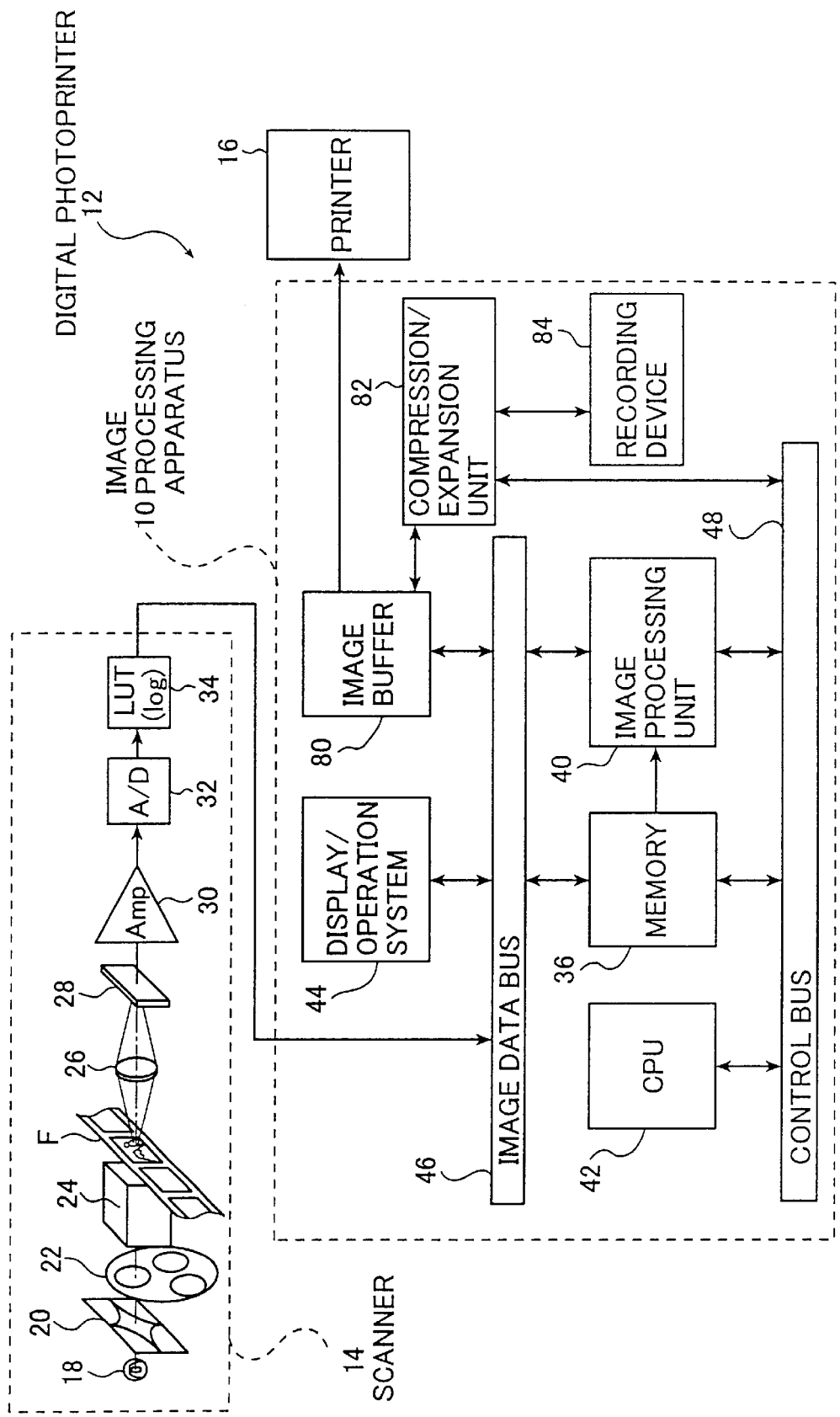
FIG. 1 is a block diagram showing an embodiment of an image processing apparatus of the present invention and an embodiment of a scanner for supplying image data to the image processing apparatus.

FIG. 1 shows a schematic view of a digital photoprinter making use of the image processing apparatus of the present invention.

A digital photoprinter 12 shown in FIG. 1 comprises an image processing apparatus 10 of the present invention, a scanner 14 and a printer 16. The respective frames of an image recorded on a film F or the like are sequentially and photoelectrically read out by the scanner 14 one by one. Image data are output to the image processing apparatus 10, where the image data are subjected to a predetermined image processing and output to the printer 16 as image data for recording. In the printer 16, a photosensitive material Z is scanned and exposed with light beams modulated in accordance with the image data, and the exposed photosensitive material Z is developed and output as finished prints P.

In the digital photoprinter 12 making use of the image processing apparatus 10 of the invention, image data can be output to both the printer 16 and a recording medium such as a MO at the same time. Therefore, users can be provided with both finished prints P and the recording medium which stores the image data recorded on the finished prints P.

The scanner 14 for supplying image data to the image processing apparatus 10 of the invention is an apparatus for photoelectrically reading out the respective frames of an image recorded on the film F one by one and comprises a light source 18, a variable diaphragm 20, a color filter plate 22 having three color filters of R, G, B for separating the image on the film F into three primary colors, i.e., red (R), green (G) and blue (B) and which is rotated to have a desired color filter inserted into the optical path, a diffusion box 24 for making a reading light incident on the film F uniform in the surface direction of the film F, an imaging lens 26, a CCD sensor 28 which is an area sensor for reading out one frame of the image on the film F, an amplifier 30, an A/D (analog/digital) converter 32, and a LUT (look up table) 34 for performing logarithmic conversion on signals to produce density signals.

In the scanner 14 as described above, reading light issued from the light source 18 is adjusted in quantity by means of the variable diaphragm 20, passed through the color filter plate 22 to be adjusted in color and diffused by the diffusion box 24 before it is incident on the film F, through which it is transmitted to produce projected light bearing the image of the film F.

The projected light then passes through the imaging lens 26 to be imaged on the light-receiving surface of the CCD sensor 28, which reads the image photoelectrically. Output signals from the CCD sensor 28 are amplified by the amplifier 30, converted to digital signals by the A/D converter 32, further converted to density signals in the LUT 34 and sent to the image processing apparatus 10 of the invention as image data of the image recorded on the film F.

The scanner 14 performs such image reading three times by sequentially inserting the R, G and B color filters of the color filter plate 22 into the optical path such that one frame of the image on the film F is separated into the three primary colors R, G and B for subsequent reading.

The illustrated scanner 14 carries out prescanning to read out an image at a low resolution to thereby determine the aperture volume of the variable diaphragm 20 and set image processing conditions before fine scanning is carried out to obtain image data to be output to the printer 16. Thus, the scanner 14 reads one frame of image (or outputs image data) by performing six consecutive image reading operations.

When one of the frames of an image is completely read out, the film F is fed by one frame by a feeder (not shown) and a next frame is fed to a reading position and when the memory 36 of the image processing apparatus 10 to be described later has an empty or writable area, the next frame is read out by repeating the above process.

The image processing apparatus 10 subjects the image data sent from the scanner 14 to a predetermined image processing and outputs the thus processed image data to the printer 16. The image processing apparatus 10 comprises a memory 36, an image processing unit 40, a CPU 42, a display/operation system 44, an image data bus 46, a control bus 48, an image buffer 80, compression/expansion unit 82 and a recording device 84.

Although the number scanners connected to the image processing apparatus 10 in the illustrated digital photoprinter 12 is one, the number of the scanners (image reading apparatus) connected to the image processing apparatus of the present invention is not limited to one, but two or more scanners may be connected thereto. Further, a scanner for reading out the image of a printed matter and a photograph can be connected to the image processing apparatus, in addition to the scanner for reading out the film F (light-transmitting original) as shown in the drawing.

Further, the printer connected to the image processing apparatus 10 is not limited to one, but a plurality of printers may be connected thereto.

The memory 36 is a frame memory and the image data of one frame sent from the scanner 14 passes through the image data bus 46 and is stored in the memory 36.

It is noted that the number memories in the image processing apparatus 10 of the invention is not limited to one, but the apparatus may be provided with a plurality of memories. These memories may be used alternately to prevent the transfer of image data from the scanner 14 from being stopped until the memory has an empty or writable area. In addition, the memory 36 may be used as a memory dedicated to the fine-scanned image data and a memory dedicated to prescanned image data may be separately provided.

The image processing unit 40 reads the image data which were output from the scanner 14 and stored in the memory 36, and subjects the read image data to the image processing to thereby produce image data in accordance with recording by the printer 16, that is, image data for the printer 16. The image processing unit 40 is composed of the combination of memories and various types of processing circuits.

In a preferred embodiment of the illustrated image processing apparatus by pipeline processing. The image processing unit 40, shown in FIG. 3, sequentially reads.

The CPU 42 functions as the condition setting unit of the invention, calculates image processing conditions by preparing a density histogram and the like from the image data (prescanned image data) stored in the memory 36 and sets the conditions to the image processing unit 40. That is, the image processing by the image processing unit 40 is carried out in accordance with the image processing conditions set by the CPU 42.

It is noted that in the image processing apparatus of the present invention, the method of setting the image processing conditions is not limited to the method of using the prescanned image data, but they may be set using finely scanned data.

The display/operation system 44 includes a display unit, a mouse, a keyboard and the like and carries out the operation of the whole image processing apparatus 10 and the whole digital photoprinter 12, the display of an image and an operating instruction, as well as the instruction, setting and the like of the verification carried out by the operator and the image processing conditions which are executed when necessary.

The image data bus 46 is a bus for inputting and outputting image data such as image data sent from the scanner 14, image data processed by the image processing unit 40 and the like. The scanner 14, the memory 36, the image processing unit 40, the display/operation system 44 and the image buffer 80 are connected to the image data bus 46.

On the other hand, the control bus 48 is a bus for inputting and outputting control data and the like. The memory 36, the image processing unit 40, the CPU 42 and the compression/expansion unit 82 are connected to the control bus 48.

The illustrated image processing apparatus 10 includes the image data bus used to input and output image data and the control bus, which are provided independently of each other to enable a rapid processing.

In the illustrated image processing apparatus 10, image processing of image data transferred from the scanner 14 is carried out as follows:

When the scanner 14 starts to read out one frame of the image on the film F, the image data thereof are stored in the memory 36.

When the prescanned image data are all stored in the memory 36, the CPU 42 reads the prescanned image data from the memory 36, and calculates image processing conditions, which are set to the image processing unit 40.

It is noted that after the image processing conditions are set, an image (prescanned image) processed under the image processing conditions is displayed as required (in accordance with the operation mode selected by the operator) on the display of the display/operation system 44 to thereby permit the operator to make the verification and the adjustment of the image processing conditions such as the color/density and the like.

When the image processing conditions are set, the image processing unit 40 reads the fine-scanned image data from the memory 36 and subjects the image data to the pipeline processing. The image data are output to the image data bus 46 after the end of all image processing operations.

Image data output to the image data bus 46 are basically used for image recording by the printer 16. In the image processing apparatus 10 of the present invention, the printer 16 is connected to the image data bus 46 through the image buffer 80 which is connected to the image data bus 46 and stores image data temporarily. The image buffer 80 is connected not only to the printer 16, but also to the recording device 84 for storing image data in a recording medium such as a MO and the like.

In this image processing apparatus 10 of the invention, image data processed by the image processing unit 40 and output to the image data bus 46 are temporarily stored in the image buffer 80, then supplied to the printer 16 and/or the recording device 84. That is, according to the invention, image data can be supplied to the printer 16 (or time-shared), while being simultaneously supplied to the recording device 84 used to store the image data in a recording medium. Therefore, outputting of a finished print P by the printer 16 can be carried out parallel with outputting of a recording medium storing image data of an image reproduced on the finished print P to thereby provide users with both the finished print P and the recording medium.

The image buffer 80 is connected to the recording device 84 through the compression/expansion unit 82.

The compression/expansion unit 82 compresses, as required, the image data to be stored by the recording device 84 by means of a known method. In the case where the image data are compressed when being read by the recording device 84, the compression/expansion unit 82 expands the image data and supplies the expanded image data to the image buffer 80, as described below.

The requirement of outputting an image on a photograph as a file of image data is deemed to be increased with the spread of digital cameras and personal computers, as described above. However, the image processing apparatus 10 of the invention enables users to receive finished prints P and image data at the same time. In addition, according to the image processing apparatus 10 of the invention, image data stored in a recording medium by the recording device 84 are those subjected to a high level image processing so as to correspond to the finished print appreciated as a photograph. Extremely high quality images can also be reproduced on a display of a computer or the like.

According to the image processing apparatus 10 of the invention which disposes between the printer 16 and the image processing unit 40 the image buffer 80 from which image data are supplied to the printer 16 and the recording device 84, storing of image data in a recording medium hardly affects the supply of image data to the printer 16. That is, outputting of image data highly processed to the recording medium can be carried out, parallel with outputting of finished prints P, without reducing the output rate and efficiency of the finished prints P to thereby provide users with the finished prints and the recording medium. Therefore, the recording medium which stored image data can be provided at an extremely low cost, for example, at a charge including the cost of the recording medium and a certain service charge, by simultaneously outputting the finished prints P and the recording medium having image data stored therein.

In the image processing apparatus 10 of the invention, the recording device 84 is not limited to any particular type, but known devices are available depending on the recording medium used, such as a disk drive for storing and reading out image data in the recording medium.

It is noted that known recording media such as a MO, a Zip, a hard disk, a floppy disk, a mini-disk, a photo compact disk and the like are available.

It is needless to say that the image processing apparatus 10 of the invention is not limited to the type which carries out the supply of image data to the printer 16 and the recording device 84 at the same time, but that the former or the latter can be selectively actuated. Image data provided to the recording device 84 and the printer 16 are not limited to those subjected to the image processing in the image processing unit 40, but may be those which have not been processed yet after being read out by the scanner 14.

According to the image processing apparatus 10 of the invention, it is further possible not only to store image data in a recording medium, but also to read out image data previously stored in the recording medium by the recording device 84. In this case, the image data read out by the recording device 84 are sent to the image buffer 80 after expanding as required in the compression/expansion unit 82. The image data may be output from the image buffer 80 to the printer 16 to provide finished prints P. Alternatively, the image data may be returned to the image processing unit 40 through the image data bus 46 and subjected to the image processing (which may be the first processing or the reprocessing) before outputting to the printer 16 and/or the recording device 84.

Output image data supplied from the image buffer 80 to the printer 16 are transferred to the driver 50 of the printer 16, and subjected to D/A conversion.

The driver 50 drives the acoustic optical modulator (AOM) 54 of an image exposing unit 52 so that light beams are modulated in accordance with the image data subjected to the D/A conversion.

Figure 2:
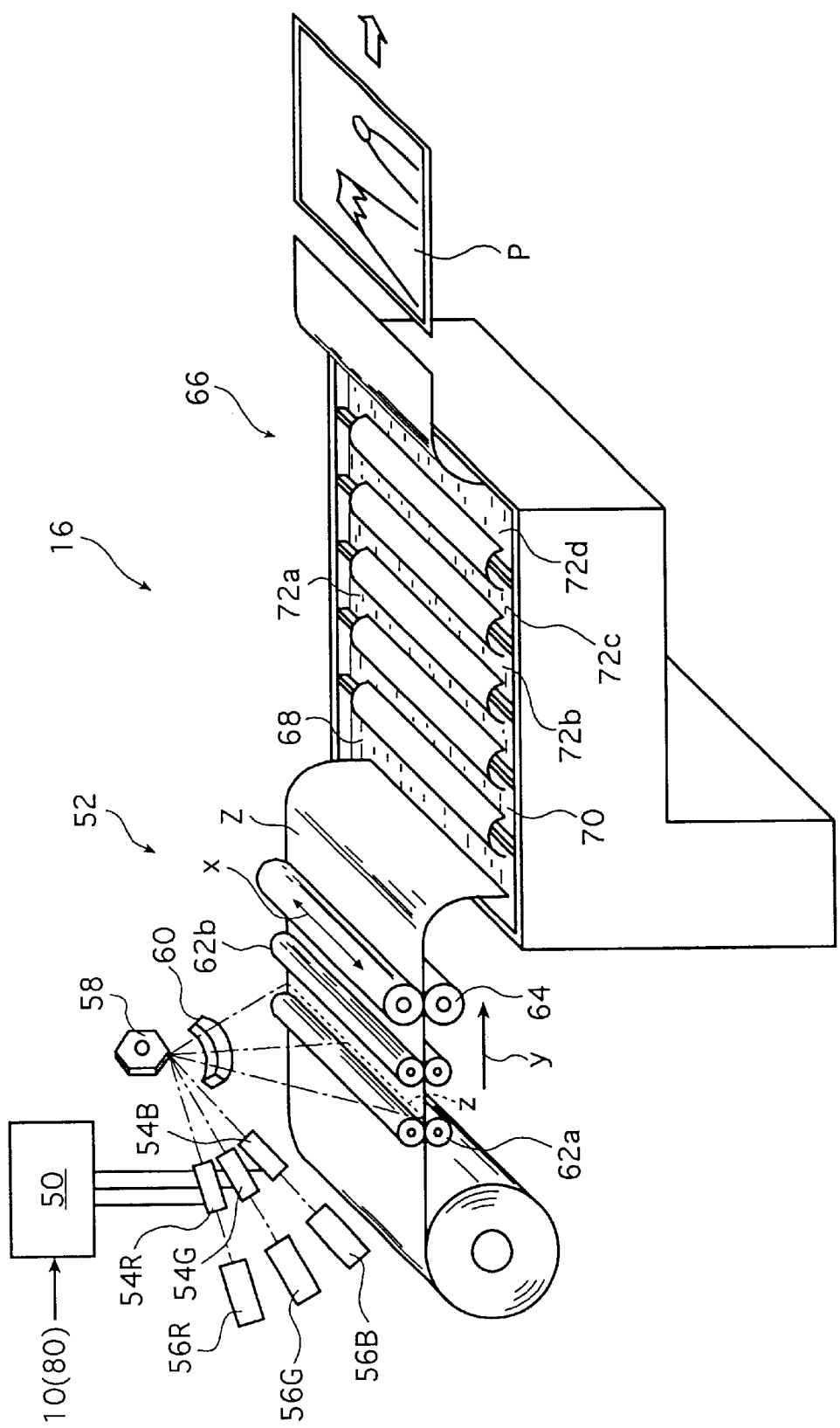
FIG. 2 is a conceptual view of a printer to which the image processing apparatus of the present invention shown in FIG. 1 outputs image data.

The image exposing unit 52 records the image of the above image data to a photosensitive material Z by scanning and exposing the photosensitive material Z with light beams. As conceptually shown in FIG. 2, the image exposing unit 52 comprises a light source 56R for emitting a light beam having a narrow bandwidth region corresponding to the exposure of an R photosensitive layer formed to the photosensitive material Z, a light source 56G corresponding to the exposure of a G photosensitive layer and a light source 56B corresponding to the exposure of a B photosensitive layer likewise, AOMs 54R, 54G and 54B which modulate the light beams emitted from the respective light sources in accordance with the respective images to be recorded, a polygon mirror 58 as a light deflector, a f θ lens 60 and auxiliary scanning/feed means for the photosensitive material Z.

The respective light beams which are emitted from the light sources 56 (56R, 56G, 56B) and travel at a different angle are incident on the AOMs 54 (54R, 54G, 54B) which correspond thereto. Driving signals of R, G, B which correspond to the image to be recorded, that is, the image data supplied from the image processing apparatus 10 are transferred from the driver 50 to the respective AOMs 54, where the incident light beams are subjected to intensity modulation in accordance with the image to be recorded.

The respective light beams modulated by the AOMs 54 are incident on the polygon mirror 58 at approximately the same points thereof, reflected thereat, and are deflected in a main scanning direction (the direction of an arrow x in the drawing), and are then adjusted by the f θ lens 60 so as to be imaged at a predetermined scanning position z in a predetermined beam shape and incident on the photosensitive material Z. It is noted that light beam shaping device and an optical system for correcting the tilt of the reflecting surfaces of the polygon mirror 58 may be disposed in the image exposing unit 52 when necessary.

The photosensitive material Z is loaded to a predetermined position in a rolled and shaded state.

The photosensitive material Z is drawn out by a drawing roller (not shown) and fed by feed roller pairs 62a, 62b with scanning in an auxiliary scanning direction (in the direction of an arrow y in the drawing) which is perpendicular to the main scanning direction, while being held at a scanning position z. The feed roller pairs 62a, 62b are disposed on each side of the scanning position z which constitutes an auxiliary scanning device.

Since the light beams are deflected in the main scanning direction, the entire surface of the photosensitive material Z which is fed in the auxiliary scanning direction is two-dimensionally scanned and exposed with light beams, so that the image (latent image) of the image data transferred from the image processing apparatus 10 is recorded on the photosensitive material Z.

The photosensitive material Z having been exposed is then fed to a developing unit 66 by a feed roller pair 64 and subjected to the development processing to thereby produce finished prints P.

When the photosensitive material Z is a silver salt photosensitive material, the developing unit 66 comprises a color developing bath 68, a bleaching/fixing bath 70, washing baths 72a, 72b, 72c and 72d, a drier, a cutter (not shown) and the like. The photosensitive material Z is subjected to predetermined treatments in the respective baths and dried and then cut to a predetermined length corresponding to one print and output as finished prints P.

On the foregoing pages, the image processing apparatus of the invention has been described in detail, but the present invention is in no way limited to the stated embodiments and various improvements and modifications can of course be made without departing from the spirit and scope of the invention.

As described above in detail, according to the image processing apparatus of the present invention, since image data read out by the scanner or the like can be supplied to both the printer and the recording device, outputting of finished prints and outputting of image data to a recording medium are carried out in parallel, whereupon users can be provided with the finished prints and the recording medium storing the image data of images on the finished prints.

What is claimed is:

1. An image processing apparatus for processing a photographic image comprising:
    an image processing unit for subjecting digital image data of a photographic image to image processing;
    an image buffer for storing the image data processed in said image processing unit; and
    a recording device for recording the processed digital image data on a recording medium, wherein the processed digital image data is output in parallel to both the recording device for recording on a recording medium, and an external printer for printing the photographic image, wherein said image processing unit includes a color/gradation processing unit for correcting color and gradation of digital image data of the photographic image, a scale convention processing unit for enlarging and reducing the digital image data of the photographic image, a dynamic range processing unit for compressing and expanding a dynamic range of the digital image data of one frame of the photographic image and a sharpness processing unit for enhancing a sharpness of the digital image data of the photographic image, and carries out color/gradation processing, scale conversion processing, dynamic range processing and a sharpness processing in parallel.

2. An image processing apparatus according to claim 1, wherein said external printer outputs a finished photographic print on which said processed image data is recorded and wherein said recording device records said processed image data of the finished photographic print on a recording medium.

3. An image processing apparatus according to claim 1, wherein said image processing unit carries out image processing by pipeline processing.

4. An image processing apparatus according to claim 1, wherein said digital image data is image data of the photographic image photoelectrically read out at a low resolution by an image reading apparatus.

5. The image processing apparatus of claim 1, further comprising:
    a condition setting unit for setting image processing conditions of said image processing unit.

6. An image processing apparatus according to claim 1, further comprising a compression/expansion unit for compressing the digital image data to be stored by the recording device and expanding the compressed image data read out by the recording device.

7. An image processing apparatus according to claim 5, wherein said image processing unit carries out image processing on high resolution digital image data of the photographic image photoelectrically read out at a high resolution after the image processing conditions have been set by the condition setting unit.

8. The image processing apparatus of claim 5, wherein the condition setting unit sets image processing conditions of the image processing unit based on data of the photographic image photoelectrically read out at a low resolution.

9. The image processing apparatus of claim 1, wherein the recording device records the processed digital image data on a computer readable recording medium.

10. The image processing apparatus of claim 9, wherein the computer readable recording medium is a floppy disk.

11. The image processing apparatus of claim 1, wherein the recording device records the processed digital image data on a magneto-optical recording medium.

12. The image processing apparatus of claim 1, wherein the processed digital image data is simultaneously output to both the recording device and external printer.

13. A digital photoprinter, comprising:
    a scanner for scanning a photographic image and producing digital image data;
    an image processing apparatus for subjecting the digital image data to image processing, and including an image buffer for storing the processed digital image data and a recording device for recording the processed digital image data on a recording medium, wherein said image processing unit includes a color/gradation processing unit for correcting color and gradation of digital image data of the photographic image, a scale convention processing unit for enlarging and reducing the digital image data of the photographic image, a dynamic range processing unit for compressing and expanding a dynamic range of the digital image data of one frame of the photographic image and a sharpness processing unit for enhancing a sharpness of the digital image data of the photographic image, and carries out color/gradation processing, scale conversion processing, dynamic range processing and a sharpness processing in parallel; and
    a printer for printing the photographic image from the processed digital image data, wherein the processed digital image data is output in parallel to both the recording device and the printer.

14. The digital photoprinter of claim 13, wherein the scanner photoelectrically generates the digital image data.

15. The digital photoprinter of claim 13, wherein the processed digital image data is simultaneously output to both the recording device and the printer.

16. The digital photoprinter according to claim 13, wherein the image processing apparatus includes an image data bus for inputting and outputting image data, which includes the digital image data and the processed digital image data, and a control bus for inputting and outputting control data.

17. The digital photoprinter of claim 13, wherein the image processing apparatus carries out image processing by pipeline processing.

18. The digital photoprinter of claim 13, wherein the scanner produces low resolution digital image data for setting image processing conditions of the image processing apparatus and high resolution digital image data for processing based on the set image processing conditions.

19. The digital photoprinter of claim 13, wherein the recording device records the processed digital image data on a computer readable recording medium.

20. The digital photoprinter of claim 13, wherein the recording device records the processed digital image data on a magneto-optical recording medium.

21. The image processing apparatus according to claim 1, further comprising an image data bus for inputting and outputting image data, which includes the digital image data and the processed image data, and a control bus for inputting and outputting control data.

* * * * *